(12) United States Patent
Philippin

(10) Patent No.: US 9,862,043 B2
(45) Date of Patent: Jan. 9, 2018

(54) GEAR CUTTING MACHINE AND METHOD FOR MACHINING GEAR TEETH

(71) Applicant: GLEASON-PFAUTER MASCHINENFABRIK GMBH, Ludwigsburg (DE)

(72) Inventor: Matthias Philippin, Rutesheim (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 53 days.

(21) Appl. No.: 14/907,835

(22) PCT Filed: Jul. 29, 2014

(86) PCT No.: PCT/EP2014/002068
§ 371 (c)(1),
(2) Date: Jan. 27, 2016

(87) PCT Pub. No.: WO2015/014483
PCT Pub. Date: Feb. 5, 2015

(65) Prior Publication Data
US 2016/0167146 A1    Jun. 16, 2016

(30) Foreign Application Priority Data
Jul. 30, 2013   (DE) .................. 10 2013 012 660

(51) Int. Cl.
*B23F 5/22*      (2006.01)
*B23F 23/12*    (2006.01)
*B23F 23/08*    (2006.01)

(52) U.S. Cl.
CPC ............ *B23F 23/1243* (2013.01); *B23F 5/22* (2013.01); *B23F 23/08* (2013.01); *Y10T 409/10159* (2015.01); *Y10T 409/101749* (2015.01)

(58) Field of Classification Search
CPC .. B23F 5/22; B23F 23/08; B23F 23/12; B23F 23/1243; Y10T 409/10159;
(Continued)

(56) References Cited

U.S. PATENT DOCUMENTS 1,962,365 A * 6/1934 Sinderson ................ B23F 5/22
                                                                    409/19
2,839,968 A * 6/1958 Moncrieff ................ B23F 5/22
                                                                    409/14
(Continued)

FOREIGN PATENT DOCUMENTS

DE        10113653 A1    9/2002
EP        0500104 A2     8/1992
(Continued)

OTHER PUBLICATIONS

International Search Report and Written Opinion for PCT/EP2014/002068, ISA/EPO, dated Mar. 2, 2015, 11 pgs., with English translation thereof (10 pgs).

*Primary Examiner* — Daniel Howell
(74) *Attorney, Agent, or Firm* — Robert L. McDowell

(57) ABSTRACT

The invention concerns a gear-cutting machine for the machining of gear teeth with a gear-cutting tool driven in rotary movement about its tool axis, further with an assembly that includes a tool holder for the gear-cutting tool and is rotatably mounted on a carrier, allowing the tool axis to be set in a desired orientation, with an actuator device through which the assembly can be set to a desired angular position, and with a locking device that allows the assembly to be secured against being dislodged from the set angular position. According to the invention, a protruding arm that is a functional element of the actuator device is coupled to the assembly through a non-rotatable connection.

14 Claims, 2 Drawing Sheets

Figure 1:
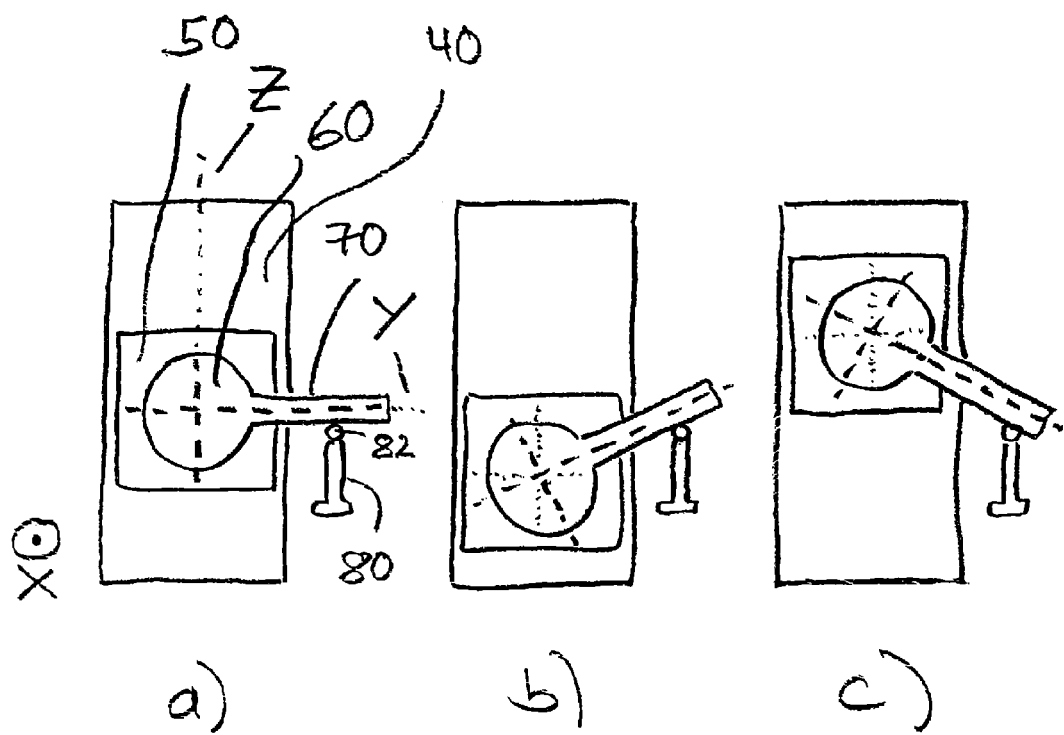

(58) Field of Classification Search
CPC . Y10T 409/101749; Y10T 409/102703; Y10T 409/102862; Y10T 409/10318
See application file for complete search history.

(56) References Cited

U.S. PATENT DOCUMENTS

| | | | | |
|---|---|---|---|---|
| 2,882,799 | A | * | 4/1959 | Budnick ............. B23F 23/1281 409/11 |
| 3,232,170 | A | * | 2/1966 | Findley .................... B23F 5/22 318/39 |
| 4,427,324 | A | * | 1/1984 | Fransson .................. B23F 5/22 409/12 |
| 5,228,814 | A | | 7/1993 | Suwijn |

FOREIGN PATENT DOCUMENTS

| | | | | |
|---|---|---|---|---|
| GB | 200157 A | * | 7/1923 | ............... B23F 5/22 |
| WO | WO 8200263 A1 | * | 2/1982 | ............... B23F 5/22 |
| WO | 2011/010209 A1 | | 1/2011 | |

* cited by examiner

GEAR CUTTING MACHINE AND METHOD FOR MACHINING GEAR TEETH

The invention concerns a gear-cutting machine for the machining of gear teeth with a gear-cutting tool driven in rotary movement about its tool axis, with an assembly that includes a tool holder for the gear-cutting tool and that is rotatably mounted on a carrier, allowing the tool axis to be set in a desired orientation, further with an actuator device through which the assembly can be set to a desired angular position, and with a locking device that allows the assembly to be secured against being dislodged from a set angular position. In addition, the invention also concerns a method for the machining of gear teeth.

Gear-cutting machines meeting this generic description have been known for some time, for example as so-called six-axis hobbing machines. A typical configuration of this type of hobbing machine can be explained as follows: In the part associated with the workpiece, these machines have a workpiece spindle supported in bearings on a machine bed and driven in rotary movement, with a workpiece clamped to the workpiece spindle, whose workpiece spindle axis represents a first machine axis of the hobbing machine. The five other machine axes are arranged in the part of the machine that is associated with the tool.

A linear movement axis of a horizontal carriage which is supported by the machine bed and serves for the infeed constitutes a second machine axis of the hobbing machine, and a linear movement axis of a vertical carriage supported by said horizontal carriage constitutes a third machine axis serving for the advance movement in this type of gear-cutting machine.

A tool head is rotatably mounted on the vertical carriage. The rotary axis of this rotatable supporting connection represents a fourth movement axis of the hobbing machine, which serves to set the orientation of the hob axis to match the desired helix angle of the gear teeth to be machined. The rotatable mount of the tool head is arranged in such a way that the tool head can in addition perform a linear shift movement, specifically by way of a further linear carriage whose movement axis constitutes the fifth movement axis of the hobbing machine. Accordingly this fifth movement axis, along which the shifting takes place, is not fixed in space, since its orientation changes with the rotation about the rotary axis of the tool mount. Normally, the fifth movement axis coincides with the axis of rotation of the hob. Finally, the sixth machine axis of the hobbing machine is the axis of rotation of a driven rotating tool spindle which carries the hob itself.

Prior to the development of machine tools in which the machine axes are completely under computerized numerical control (CNC), the two main axes of the machining process, i.e. for the rotation of the workpiece and for the rotation of the hob, were mechanically coupled to each other in order to ensure the correct geometric conditions for the tool engagement. Meanwhile, the required synchronization of the respective rotary positions of the axes for the correct meshing of the teeth is performed electronically through CNC as known in the art.

Likewise, the secondary machine axes that serve to set the mutual spatial positions of the workpiece and the hobbing tool relative to each other, i.e. the aforementioned second to fifth machine axes (infeed movement, advance movement, rotary position, and shifting movement) are driven by servo motors under computerized numerical control. In many cases so-called direct drives are used for most of the axes, meaning that no transmission unit is interposed between the computer-controlled servomotor and the machine axis whose movement is being actuated.

A modern hobbing machine can thus be characterized as a six-axis CNC machine tool with servo drive motors.

The present invention has the objective to bring further improvements to gear-cutting machines of the kind described above, particularly in regard to structural rigidity.

This task is solved by the invention through a further developed version of a gear-cutting machine of the kind described above, which is distinguished in essence by a protruding arm that is non-rotatably coupled to the assembly and is a functional element of the actuator device.

The invention was motivated by the observation that the drive mechanism used heretofore for the swivel movement of the tool holder compromises the rigidity of the machine because of the space that is taken up by the drive mechanism and by the required connections. A similar concern applies to a drive mechanism with an interposed transmission such as a gear box arranged in the space that would otherwise be occupied by the direct drive.

The invention is further based on the observation that this drive mechanism in itself is replaceable in the path of movement transmission by way of a protruding arm. In particular the capability to rotate by a full turn or even less can be dispensed with. Preferably, the coupling of the protruding arm is located directly in the same area of the assembly as the tool holder. The protruding arm could be oriented for example in the direction of the shift axis. Simply put, the rotatable support is thus primarily only a support that is free to rotate, rather than a driven rotary support.

The space that is thereby saved in the area of the rotatable support allows a more rigid design to be realized for the entire machine, as this space becomes available for additional stiffening features.

In a preferred embodiment, the rotatably supported assembly can be mounted on a carriage arrangement. Specifically, the carrier can be a first linear carriage, in particular a vertical carriage. Accordingly, the conventionally used arrangement of further machine axes also remains compatible with the arrangement proposed by the invention.

In a particularly preferred embodiment, the drive source of the first linear carriage in an operating position of the gear-cutting machine is a functional element of the actuator device. In other words, according to this further developed embodiment, not only has the concept of a direct drive for this rotary movement been abandoned, but the concept of a dedicated drive for this axis in general, as the setting of the rotary position is realized by way of the drive of a linear carriage of a carriage arrangement.

This further aspect is also being disclosed and placed under protection by the invention independently of how the movement of the actuator device is transmitted. Accordingly, the invention also discloses as independently deserving of protection a gear-cutting machine for the machining of gear teeth with a gear-cutting tool driven in rotary movement about its axis tool axis, with an assembly that includes a tool holder for the gear-cutting tool and that is rotatably mounted on a carrier, allowing the tool axis to be set in a desired orientation, further with an actuator device through which the assembly can be set to a desired angular position, and with a locking device that allows the assembly to be secured against being dislodged from a set angular position, wherein the carrier includes at least one linear carriage that is movable by a drive source, and wherein the gear-cutting machine is in essence distinguished by the feature that the drive source of the linear carriage in an operating position of the gear-cutting machine forms the drive source of the actuator device.

While an embodiment is conceivable where a force/torque transmission to the assembly by way of the protruding arm could be originally introduced at the end of the protruding arm on the opposite side of the non-rotating connection, with the protruding arm acting as a lever, the preference is for an embodiment wherein the actuator device comprises a counter bearing which cooperates with the end of the protruding arm on the opposite side of the non-rotating connection. The counter bearing is likewise a functional element of the actuator device and delivers, in the form of reactive forces, the counterforces that enable the rotation of the assembly, while the direct effect of the original, causative source of the driving force is a translatory movement of the assembly itself.

In a further developed form of this preferred variant, the cooperation between the counter bearing and the end of the protruding arm takes place in the form of a rolling support. This reduces wear and lengthens the operating life of the functional elements of the actuator device.

In a particularly preferred embodiment, the drive source of the first linear carriage does not operate as a functional element of the actuator device in a second operating position of the gear-cutting machine. Accordingly, a motor-driven adjustment of the angular position of the assembly independent of the locking device is not possible in the second operating position. The preferred use of the second operating position is for the machining of the toothed workpieces with the gear-cutting tool.

In a preferred embodiment, a transition between the first and the second operating position is effected by a relative movement between the first linear carriage and the counter bearing transverse to the movement direction of the first linear carriage.

In this arrangement, the first linear carriage could be supported by a further linear carriage, in particular by a horizontal carriage, so that the carrier structure for the rotatable assembly is configured as a cross-slide carriage. If the relative movement for the transition between the first and the second operating position is performed through a movement of the second linear carriage, the latter is assigned a dual function, driving on the one hand the infeed movement and on the other hand the transition between the two operating positions.

It is seen as practically advantageous if the angular positions that can be set for the assembly cover a range of at least 90° and if in particular the orientations that can be set for the tool axis cover a range of at least ±45° relative to the horizontal. This shortens the linear travel distances required for the turning of the assembly that carries the tool head. Besides, it is envisioned with preference that the length of the counter bearing in the movement direction of the first linear carriage reaches as far as the mid-range of the travel path of the linear carriage. Accordingly, in the example of a vertical milling machine with a vertically oriented workpiece spindle axis, the engagement between the counter bearing and the protruding arm occurs preferably at a height level closer to the halfway point of the vertical travel range of the first linear carriage than to the travel return points, i.e. the ends of the range.

In a particularly preferred embodiment, the gear-cutting machine is configured as a hobbing machine, wherein the tool holder is designed as a tool head to hold a hob. However, the invention is also advantageously employed in other gear-cutting machines, as for example in generation grinding, power skiving, or also in gear-shaping (in the latter case with rotation in the X/Z-plane instead of the Y/Z-plane).

The invention is also placed under patent protection from a method-oriented point of view. Thus, the invention also concerns a method for the machining of a toothed workpiece with a gear-cutting tool driven in rotary movement about its tool axis, wherein the latter has a prescribed orientation and the method includes the setting and locking of the orientation, with the distinguishing feature that the setting of the orientation is performed with the help of a protruding arm that is coupled for joint rotary movement with a rotatably supported assembly, wherein the orientation of the tool axis is non-rotatable relative to said assembly.

In particularly preferred embodiment, the setting of the orientation of the tool axis is performed with the help of a drive mechanism which is used for a relative movement between the gear-cutting tool and the toothed workpiece (with locked orientation of the tool axis). As explained above, this function can also be performed independently of the nature of the releasable coupling between this drive mechanism and the rotatable assembly.

Consequently, the invention also provides a method for the machining of gear teeth with a machining tool driven in rotary movement about its tool axis at a prescribed orientation of the latter, wherein as a first step, the tool axis is set to, and locked at, the prescribed orientation, and next a relative movement between the tooth-cutting tool and the toothed workpiece is executed prior to and/or during the machining, wherein the distinguishing feature of the method is in essence that the setting of the orientation of the tool axis and the execution of the relative movement are actuated by the same drive mechanism.

Figure 2:
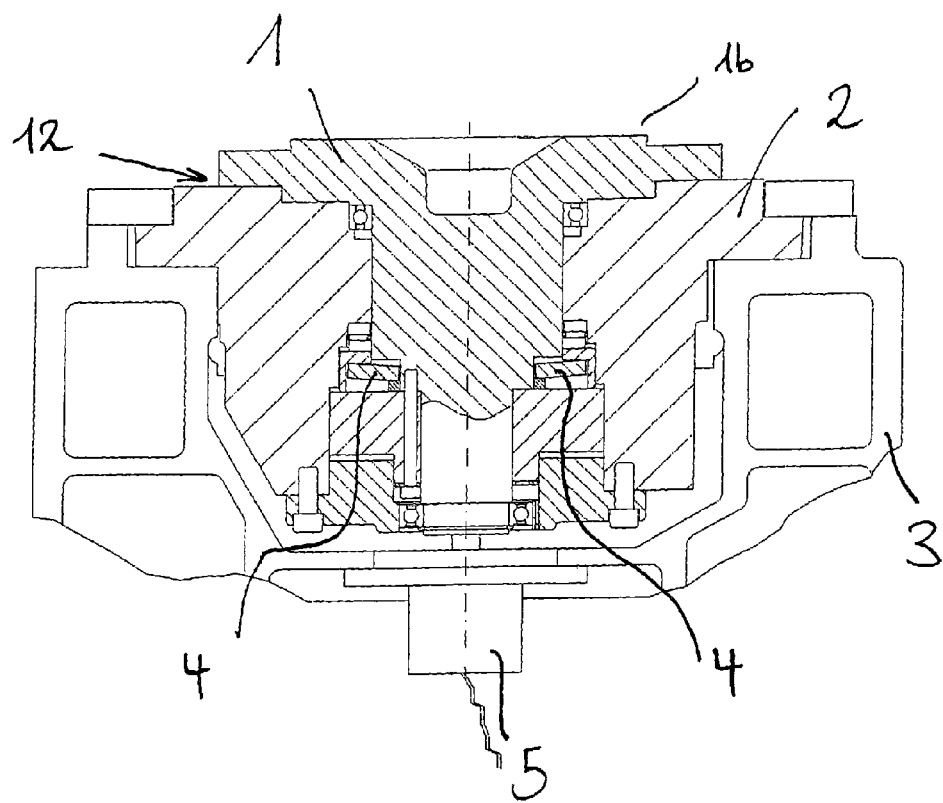

Further distinguishing features, details and advantages of the invention will become evident from the following description of the attached drawings, wherein FIGS. 1a, b, c schematically illustrate the underlying principle of the invention, and FIG. 2 represents a sectional view of a support arrangement for a tool holder configured in accordance with the invention.

FIG. 1 schematically illustrates a cross-slide carriage arrangement composed of a horizontal carriage 40 that is movable in the X-direction (perpendicular to the plane of the drawing) and a vertical carriage 50 that is arranged on a side of the horizontal carriage 40 facing towards the workpiece spindle (the latter not being shown in the drawing). The vertical carriage is movable vertically, i.e. in the Z-direction.

The vertical carriage 50 rotatably supports an assembly 60 on which a hobbing tool head (not shown in the drawing) is arranged in the conventional manner by way of a further shift carriage. The orientation of the rotary axis of a hob that is held by the hobbing tool head in relation to the plane extending orthogonal to the movement axis X of the horizontal carriage 40 can be changed only through a rotation of the assembly 60. The hob axis may be oriented for example parallel to the direction in which a protruding arm 70 juts out of the assembly. FIG. 1a shows a situation where this direction Y runs horizontal and perpendicular to the movement axis X of the horizontal carriage 40.

To set the angular position of the tool axis, i.e. the orientation of the direction Y in the plane extending orthogonal to the movement direction X, the horizontal carriage 40 is moved into a position in which the protruding arm 70 is positioned above a post 80. Preferably, the vertical carriage 50 is moved to a position where the protruding arm 70 near its free end comes to rest on a ball joint arranged at the upper end of the post 80. All of this activity takes place while the assembly 60 is still locked in its current angular position by a locking device (not shown) that is available to secure the hobbing tool head in the conventional manner of the state of the art. Alternatively, it is also conceivable that the post is arranged on the horizontal carriage and is movable relative to the latter. In that case, the setting of the orientation of the tool axis can be performed in any position of the horizontal carriage.

When the protruding arm has come to rest on the ball joint, for example in the angular position where the tool axis is horizontal as shown in FIG. 1, the locked condition is released.

Next, the tool axis can be turned clockwise (starting from the position shown in FIG. 1*a*) by moving the vertical carriage in the upward direction as shown in FIG. 1*c*, or counterclockwise by moving the vertical carriage 50 in the downward direction as shown in FIG. 1*b*.

As soon as the desired angular position of the assembly 60 has been attained and a signal to this effect has been received by a controller device of the hobbing machine from a sensor (not shown) detecting the angular position of the assembly 60, the locking device is activated and the assembly 60 is locked into the set angular position. In this first operating position, which in the illustrated example is determined by the travel position of the horizontal carriage 40 allowing the protruding arm 70 and the post 80 to cooperate with each other, the setting of the angular position of the assembly 60 can thus be made preferably by way of a CNC-based actuation of the vertical carriage 50.

For the machining of the workpiece in a second operating position of the gear-cutting machine, the horizontal carriage 40 is moved from the travel position just described in the direction towards the workpiece spindle, so that the vertical carriage 50 in this second operating position is unimpeded by the post 80 and free to move along its travel axis Z, i.e. able to perform the standard infeed movement parallel to the workpiece axis for the hobbing operation.

It is evident that with the use of the protruding arm 70, it is no longer necessary to couple the assembly 60 to a direct drive or to a gear train that is connected to its own drive source as normally realized in these machines through driven rotating supports.

The invention is not limited to the configuration of the gear-cutting machine described through the illustrated embodiment. For example the post 80 could also be designed without the ball joint 82, or the post 80 itself could be designed to be movable, although this would require an additional drive mechanism. In the latter case, the post 80 could for example be designed to be collapsible in the manner of a telescope, or to be fully retractable into a machine bed (not shown) in the second operating position.

Also, in the first operating position, the movement of the vertical carriage could be transmitted in a different way to the assembly, for example through a gear/rack arrangement. For the change from the first to the second operating position, the gear engagement would have to be uncoupled. The disengagement could be performed manually, for example with an actuating lever, or automatically by coupling the disengagement to the movement of the horizontal carriage 40, if the use of an additional drive mechanism is to be avoided.

FIG. 2 shows a rotatably supported part 1 in a sectional view. The free side 1*b* serves in the normal way to fasten, for example, a hobbing tool head (not shown) with tool spindle.

The rotary support of part 1 in a non-rotating part 2 is not compromised in regard to its structural strength by the presence of a drive mechanism or a transmission coupled to a drive mechanism. During the machining operation, a locking device configured as a diaphragm spring 4 ensures that part 1 can no longer rotate against part 2 (second operating position), as part 1 in the area 12 is seated on part 2 and pressed against the latter. When part 1 is moved relative to part 2 in the axial direction (X), this friction-based connection is released and part 1 can be turned relative to part 2 into a desired angular position as described in the context of FIG. 1.

Part 2 in this example is part of a vertical carriage (movement direction Z perpendicular to the drawing plane of FIG. 2) which, in turn, is movably supported on the radial carriage 3 (movement direction X), consistent with conventional practice. A sensor 5 registers the angular position of part 1 relative to part 2 and transmits this information to a controller (not shown) of the machine.

Since the arrangement for supporting part 1 in part 2 no longer has to leave room for a drive mechanism or the connection to a drive by means of a transmission, for example a worm-gear transmission, the support can be designed with significantly greater structural rigidity, which is a primary advantage of the invention. As a further advantage, the invention offers the aforementioned possibility that the drive mechanism which in this embodiment serves to actuate the vertical carriage can also be used to change the angular position of part 1 relative to part 2, which saves an entire drive mechanism.

The invention is not limited to the examples of embodiments presented in the description of the drawings. Rather, the features of the foregoing description as well as of the following claims can be essential, individually or in combination, for the realization of the invention in its different embodiments.

The invention claimed is:

1. Gear-cutting machine for the machining of gear teeth with a gear-cutting tool driven in rotary movement about its tool axis, comprising an assembly (60) that includes a tool holder for the gear-cutting tool and is rotatably mounted on a carrier (50, 40), allowing the tool axis (Y) to be set in a desired orientation,
    an actuator device through which the assembly can be set to a desired angular position, and
    a locking device that allows the assembly to be secured against being dislodged from a set angular position,
    characterized by a protruding arm (70) that is coupled to the assembly through a non-rotatable connection and is a functional element of the actuator device.

2. Gear-cutting machine according to claim 1, wherein the carrier is a first linear carriage (50) having a drive source.

3. Gear-cutting machine according to claim 2, wherein the drive source of the first linear carriage in a first operating position of the gear-cutting machine is a functional element of the actuator device.

4. Gear-cutting machine according to claim 1 wherein the actuator device comprises a counter bearing (82, 80) cooperating with the end of the protruding arm on the opposite side of the non-rotating connection.

5. Gear-cutting machine according to claim 4, wherein the cooperation takes place in the form of a rolling support.

6. Gear-cutting machine according to claim 3 wherein the drive source of the first linear carriage in a second operating position of the gear-cutting machine is not a functional element of the actuator device.

7. Gear-cutting machine according to claim 6 wherein a transition between the first and the second operating position can be effected by a relative movement between the first linear carriage (50) and a counter bearing (82, 80), wherein said relative movement runs transverse to the movement direction of the first linear carriage.

8. Gear-cutting machine according to claim 2 wherein the first linear carriage (50) is supported by a second linear carriage (40).

9. Gear-cutting machine according to claim 7 wherein the relative movement can be effected by a movement of a second linear carriage (40) that supports the first linear carriage (50).

10. Gear-cutting machine according to claim 1 wherein the angular positions that can be set for the assembly cover a range of at least 90° and wherein the orientation that can be set for the tool axis to cover a range of at least ±45° relative to a horizontal orientation.

11. Gear-cutting machine according to claim 1 wherein the gear-cutting machine is configured as a hobbing machine and can accept a hob as gear-cutting tool.

12. Method for the machining of gear teeth with a machining tool driven in rotary movement about its tool axis and at a prescribed orientation of the tool axis, wherein as a first step, the tool axis is set to, and locked at, the prescribed orientation, and next prior to and/or during the machining, a relative movement is executed between the tooth-cutting tool and the toothed workpiece, characterized in that the setting of the orientation of the tool axis and the execution of the relative movement are actuated by the same drive mechanism.

13. Gear-cutting machine according to claim 2 wherein said first linear carriage is a vertical carriage.

14. Gear-cutting machine according to claim 8 wherein said second linear carriage is a horizontal carriage.

* * * * *